(12) United States Patent
Quintana Rio

(10) Patent No.: US 9,091,387 B2
(45) Date of Patent: Jul. 28, 2015

(54) COMPOSITE ROD, MANUFACTURING METHOD AND TOOL

(71) Applicant: AIRBUS OPERATIONS S.L., Madrid (ES)

(72) Inventor: Andres Quintana Rio, Hamburg (DE)

(73) Assignee: Airbus Operations, S.L., Madrid (ES)

( * ) Notice: Subject to any disclaimer, the term of this patent is extended or adjusted under 35 U.S.C. 154(b) by 105 days.

(21) Appl. No.: 13/722,368

(22) Filed: Dec. 20, 2012

(65) Prior Publication Data

US 2013/0187015 A1    Jul. 25, 2013

(30) Foreign Application Priority Data

Dec. 22, 2011 (EP) .................................. 11382391

(51) Int. Cl.
| | |
|---|---|
| *E04C 3/00* | (2006.01) |
| *F16M 13/02* | (2006.01) |
| *B32B 37/00* | (2006.01) |
| *B32B 37/02* | (2006.01) |
| *F16C 7/02* | (2006.01) |
| *B29C 33/48* | (2006.01) |
| *B64C 1/06* | (2006.01) |

(52) U.S. Cl.
CPC .............. *F16M 13/02* (2013.01); *B29C 33/485* (2013.01); *B32B 37/0053* (2013.01); *B32B 37/02* (2013.01); *F16C 7/02* (2013.01); *B64C 1/06* (2013.01); *F16C 2326/43* (2013.01)

(58) Field of Classification Search
CPC ....... F16M 13/02; B64C 1/06; B32B 37/0053; B32B 37/02; F16C 7/02; B29C 33/485; F16C 2326/43
USPC ........... 52/843; 428/36.3, 36.9; 248/654, 637, 248/653
See application file for complete search history.

(56) References Cited

U.S. PATENT DOCUMENTS

| | | | | |
|---|---|---|---|---|
| 6,893,733 | B2 * | 5/2005 | Obeshaw ....................... 428/593 |
| 8,713,895 | B2 * | 5/2014 | Allen et al. ..................... 52/843 |
| 2004/0012198 | A1 * | 1/2004 | Brotzell et al. ................ 285/249 |
| 2005/0199308 | A1 * | 9/2005 | Swails et al. .................. 138/109 |
| 2006/0180705 | A1 | 8/2006 | Nansen |
| 2009/0101328 | A1 * | 4/2009 | Leslie et al. ................. 166/65.1 |
| 2009/0218777 | A1 | 9/2009 | Wood |

FOREIGN PATENT DOCUMENTS

| | | |
|---|---|---|
| FR | 2 545 556 A1 | 11/1984 |
| FR | 2 883 939 A1 | 10/2009 |

OTHER PUBLICATIONS

European Search Report dated Jul. 31, 2012 for Application Serial No. EP 11382391.8.

\* cited by examiner

*Primary Examiner* — Amy Sterling
(74) *Attorney, Agent, or Firm* — Jenkins, Wilson, Taylor & Hunt, P.A.

(57) ABSTRACT

The present invention describes composite rods keeping two elements apart a determined distance carrying the loads between them, such as railways, industrial premises, etc. Besides, the manufacturing method thereof and the tool involved in this process are also described.

14 Claims, 6 Drawing Sheets

-- PRIOR ART --

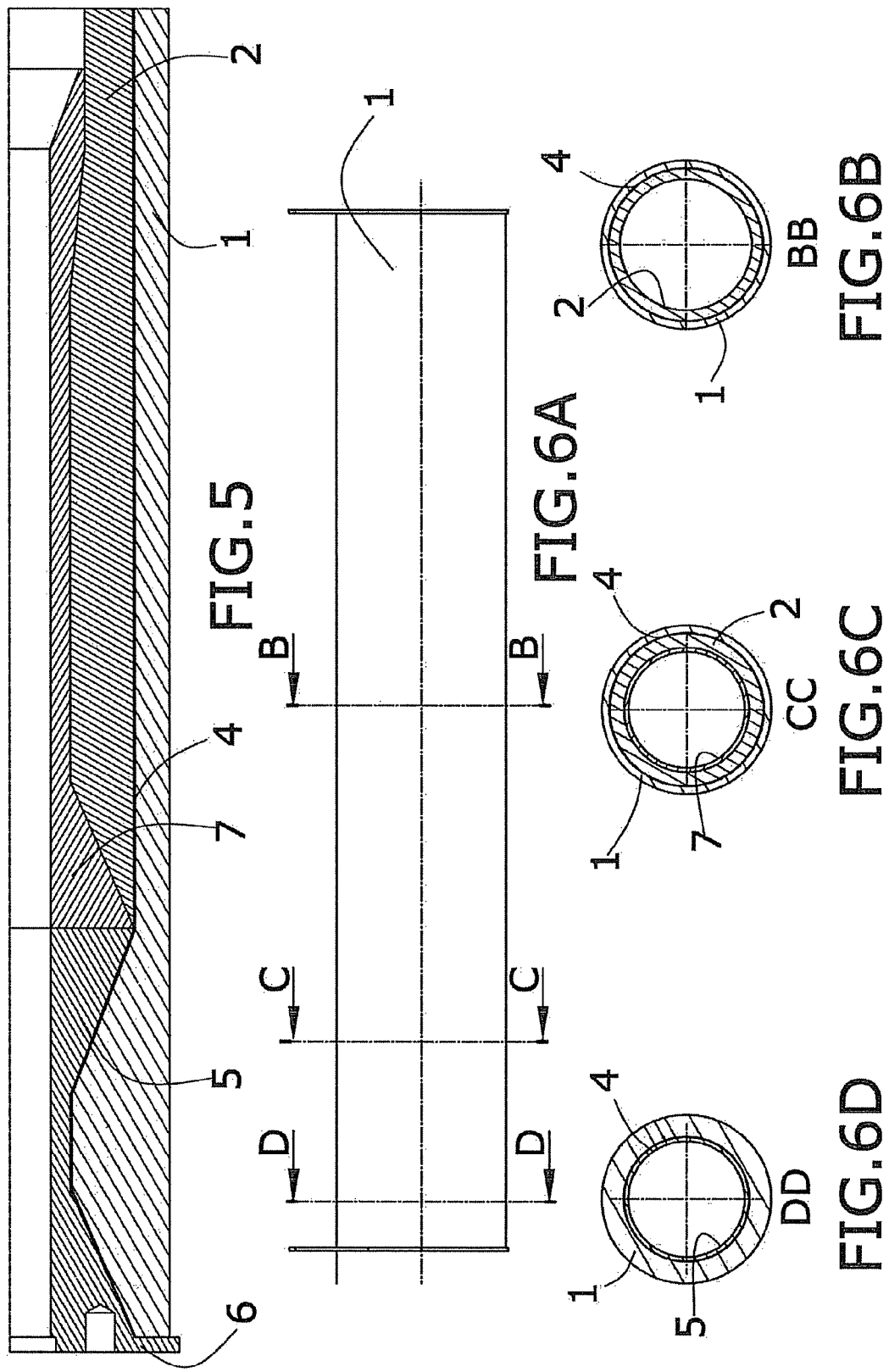

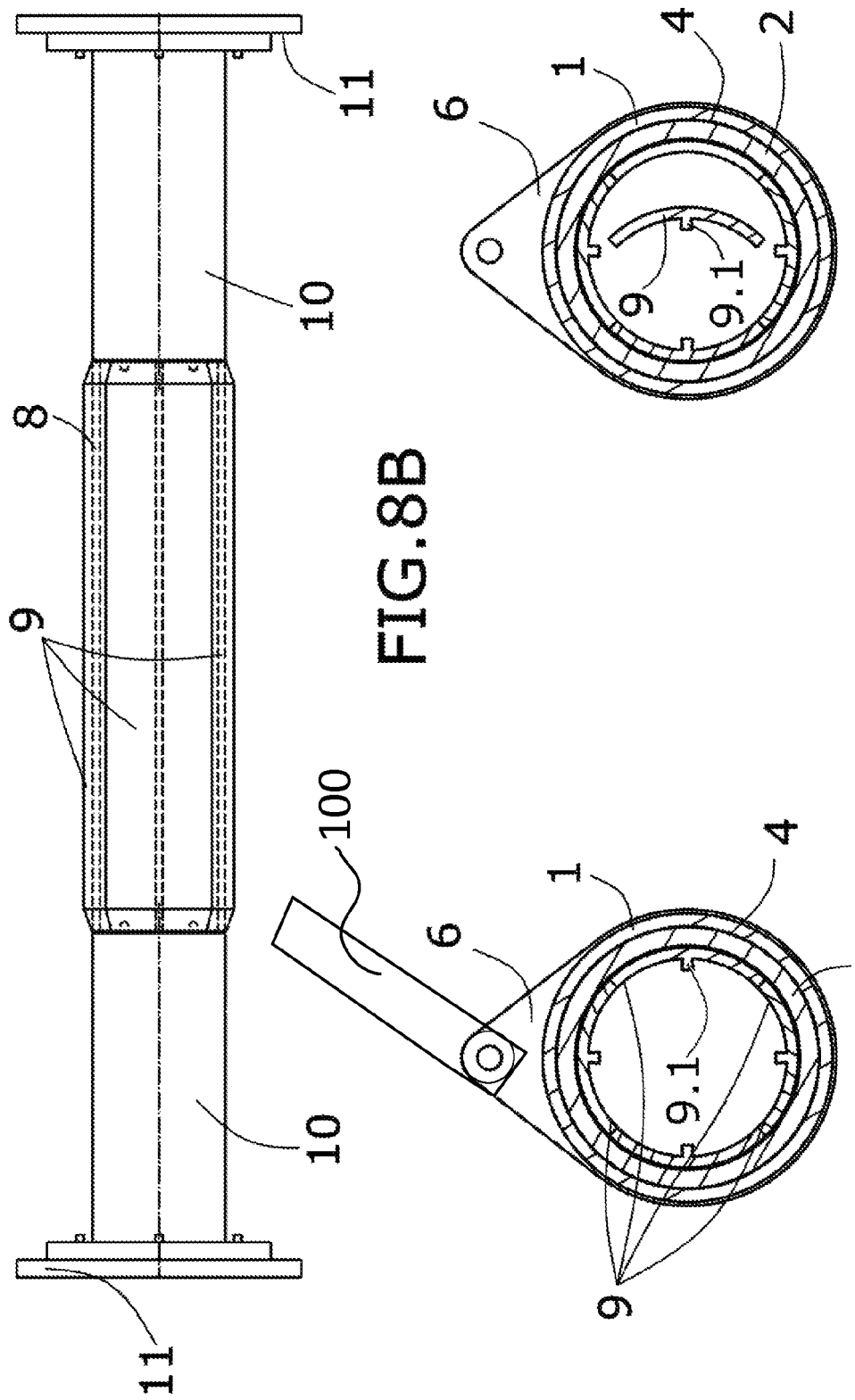

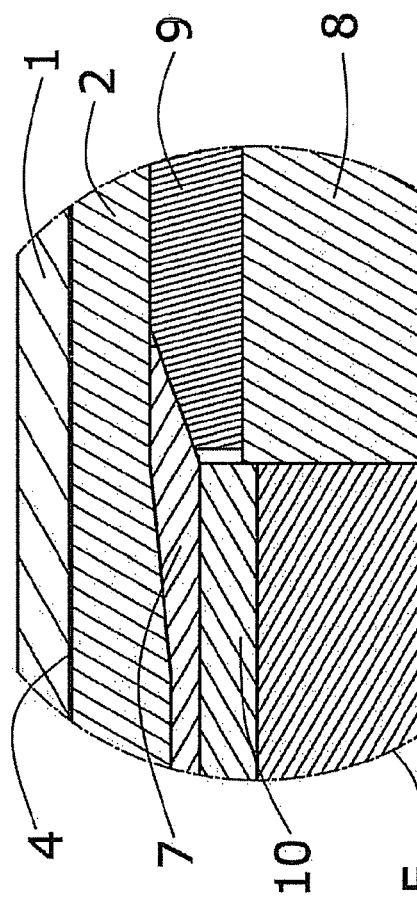
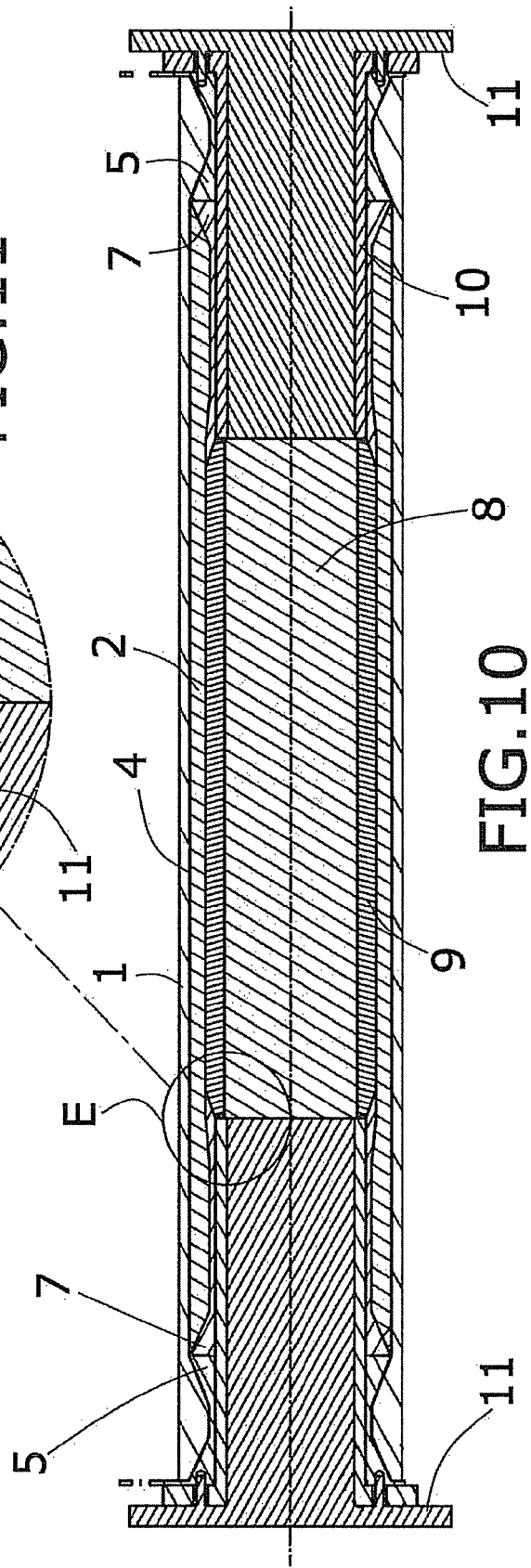
FIG. 11
FIG. 10

COMPOSITE ROD, MANUFACTURING METHOD AND TOOL

CROSS-REFERENCE TO RELATED APPLICATION

This U.S. non-provisional patent application claims priority to European Patent Application No. 11382391.8 filed on Dec. 22, 2011, the entire contents of which are hereby incorporated by reference.

FIELD OF THE INVENTION

The present invention describes composite rods, the manufacturing method thereof and the tool involved in this process. The invention belongs to the field of fibre reinforced plastic structures for the purposes of keeping two elements apart a determined distance carrying the loads between them.

BACKGROUND OF THE INVENTION

Rods are structures usually used by engineers to keep two elements apart a determined distance (fixed or variable) carrying the loads between them. Metallic rods and struts are the main elements of many designs: they support structural or system elements and ensure even load distribution within structures. Usually, the connected structures are equipped with ball bearings to avoid the transmission of moment loads.

As an example, only on the Airbus A380 more than 300 different rods are used. Among these, of relevant importance are the rods connecting the Main Landing Gear Doors (MLGD) fittings to the fuselage structure. Being these doors critical structures, the connecting path, including the doors, are submitted to additional safety requirements. In addition, the supported loads of the rods are the cyclic loads of each opening/close of the door on each landing and take-off operation, and therefore the fatigue loads are critical. Besides, the MLGD and the Belly Fairing are identified as high risk of lightning strike. This includes all conductive parts or assemblies which form the aircraft skin or outside surfaces. For that reason, the doors must be electrically grounded to the main structure. As the connection of the doors with the fuselage is through the fittings and the rods, the rods must be able to transfer the required current. This is currently done through copper bonding jumpers, attached to the rods by means of metallic clamps.

The main technical problem is that the current rods are very heavy for the purposes described. Besides, there is a problem to be solved regarding the manufacturing method which currently is made by screwing together the complex two metallic bodies once they have been manufactured independently.

DESCRIPTION OF THE INVENTION

The objects of the present subject matter are achieved by a composite rod to keep two elements apart a determined distance, a single shot manufacturing method for obtaining a hollow rod structure, and a tool to be used in the single shot manufacturing method. The particular embodiments of the subject matter are defined herein.

Without limiting the scope of use of the invention to aircrafts and generalizing to any other use requiring two elements apart a determined distance carrying the loads between them, such as railways, industrial premises, etc., the present invention presents in a first aspect a composite rod, wherein the rod comprises:

two hollow bodies, an outer body and an inner body, each one of the two bodies able to withstand the loads, providing a double path load;
These two hollow bodies, one inside the other, provide a fail-safe design to the whole structure in order to accomplish the requirement of having a double load path in case one of the bodies fails to withstand the loads due to corrosion, fatigue or accidental damage;
two rod ends, one at each end of the structure comprised by the two bodies;
Rods are designed with the adequate rigging capability to absorb the position tolerance of the interface points in the two elements being attached by them. These rods must be able to be easily adjusted in length some millimeters depending on the use it is being made of them by means of two adjustable ends;
the inner body's inner diameter bigger in substantially the centre of the structure than in the edges;
The proposed rod concept, is a hollow structure, with a bigger inner diameter in the centre (to provide enough inertia) than in the edges.
characterized in that:
the two bodies are made of a composite structure,
In the aim of achieving lighter rods, the invention substitutes the existing metallic structure by a composite structure. Fibre-reinforced plastic composites are usually made from two or more dissimilar materials in different embodiments: high strength low-density fibres (such as glass, carbon and aramid) embedded in a polymeric matrix. The matrix has the task of providing the stress transmission between the individual fibres, maintaining the dimensional stability of the structure and protecting the fibres against environmental influences, while the fibres are the load-bearing components. Long-fibre composites are highly anisotropic, having different properties in different directions. Composite materials are made of several layers, each of them comprising the components fibre and matrix. These layers comprise long fibres running one parallel to each other, and therefore the layer itself is once more highly anisotropic. These individual layers are bonded together while embedded in the matrix and cured, for example in an oven. Since the orientation, material and type of the layers can differ from each other, it is possible to tailor the fibre (layer) orientation for optimum strength/stiffness in preferred embodiments. The rigidity and strength performance of a fibre composite is largely determined by the choice of the fibre material and the layers orientation, for example from a unidirectional laminate (all fibres following the same orientation) to a quasi-isotropic laminate (same amount of fibres running in each direction). A detailed analysis is required to ensure that the full performance benefits of these materials are incorporated in any structural design of the rods. The more dominant the loading in a single direction, the better the suitability of that composite material for the rod;
and between the two bodies the rod comprises a conductor material, preferably at least one layer of copper foil.
In order to accomplish with the requirement that electrical energy must be conducted across the fibre structure as effectively as metal-built structures; the rod is provided with good electrical current return path by means of a conductor material in different embodiments, such as layer/s of copper foil.

In a second aspect, the invention presents a single shot manufacturing method for obtaining a hollow rod structure, the method comprising the following steps:

filament winding of an inner body over a mandrel;

Filament winding is a fabrication technique for manufacturing composite materials, usually in the form of cylindrical structures. The process involves winding filaments under varying amounts of tension over a male mould or mandrel. The general process of filament winding which can be applied includes a mandrel rotating while a carriage or filament winding machine moves horizontally, laying down fibres in the desired pattern. It is required to know the order of magnitude of the structures, and to have a rough idea of the number of plies, orientation, material properties required, etc., called stacking sequence. The first step of the manufacturing method includes winding a composite material over a mandrel or a tool in order to build the inner body of the composite rod. The composite material is filament shaped;

placing between the inner and outer body a conductor material, preferably at least one layer of copper foil;

Once the inner laminate of the inner body is laid up, copper foil covering the whole inner laminate is applied. This conductor material provides the required electrical conductivity of the final composite rod;

filament winding of an outer body over the inner body;

With the filament winding machine in the general process of filament winding, the fibres of the outer laminate are laid up around the inner laminate and the copper foil following the defined directions of the stacking sequence for the outer body. A filament shaped composite material is winded over the resulting structure of the previous steps;

winding of a heat shrink tape over the two bodies;

Once both bodies and the conductor material laid in between are winded over the mandrel or tool, a heat shrink tape is winded over the whole structure to provide the required pressure;

and curing in an oven the resulting structure;

All the elements obtained from the previous steps are placed in an oven for curing. The final rod including both the outer and the inner bodies is cured in a single step and therefore the method is called "single shot" compared to previous techniques where the outer body and the inner body are build up separately and fixed together afterwards.

A last aspect of the invention is a tool to be used in the single shot manufacturing method for obtaining a hollow rod structure, which comprises:

The mandrel or tool which can be used in the previously mentioned method is described hereafter and enhances the ease of manufacturing the composite rod of the invention and further includes improvements to separate the tool from the finished rod;

a central mandrel surrounded by crown parts which make at least the centre part of the inner body of a rod to be wider in substantially the center than the edges, wherein the crown parts are short enough to be removed after curing;

The crown parts are structures that are assembled forming a cylindrical shaped structure with a wider diameter in the center of the tool than in the edges. The crown parts are dismantled after they have been used for manufacturing the rod. These crown parts are assembled over the central mandrel. The reference "short enough" indicates that the crown parts are short in perimeter and after the central mandrel has been removed, they fit in the remaining gap and therefore can also be removed;

two threaded sleeves, one at each end of the central mandrel, to keep the threads fully aligned in order to allow the rod ends to be screwed;

The threaded sleeves are solid structures that are attached to the central mandrel enlarging the structure and their diameter is smaller than the diameter of the central mandrel plus the crown parts-structure in order to make the rod's diameter smaller in the edges than in the centre;

and two end tools, one at each free end of each sleeve,

The end tools are the last part of the tool and they close the whole structure;

wherein all the elements of the tool are arranged to stay assembled during rod manufacturing and dismantled after curing.

After the curing of the rod, for instance, in an oven, the different elements of the tool can be separated from the whole structure being dismantled one by one, preferably, first at least one end tool, then, the corresponding threaded sleeve, followed by the central mandrel. When the gap is empty, the crown parts are also dismantled and then removed one by one through the remaining gap left by the central mandrel and at least one threaded sleeve.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 5 In this figure a detail view of section A of FIG. 3 of the previous embodiment of the invention is shown.

FIG. 6 In this figure another view of an embodiment of the invention and different detailed views are shown;

FIG. 6A shows a side view of one embodiment of the rod of the invention without the rod ends;

FIG. 6B shows a cross-section view of the cut BB in FIG. 6A;

FIG. 6C shows a cross-section view of the cut CC in FIG. 6A;

FIG. 6D shows a cross-section view of the cut DD in FIG. 6A.

FIG. 8 This figure shows an embodiment of the tool used in the manufacturing process.

FIG. 8B shows a side view where different parts of the assembled tool can be distinguished.

FIG. 9 This figure shows the disassembling process of the elements of the tool from a cross-sectional view of the rod.

FIG. 9A shows a cross-section view of the beginning of the process with all the crown parts assembled;

FIG. 9B shows a cross-section view of the first crown part disassembled from the others.

FIG. 10 This figure shows the complex tool-rod in the moment of manufacturing the rod in a cross-sectional view of the rod.

FIG. 11 This figure is the detailed view of the part E of FIG. 10.

DETAILED DESCRIPTION OF THE INVENTION

Once the object of the invention has been outlined, specific non-limitative embodiments are described hereinafter.

Figure 1:
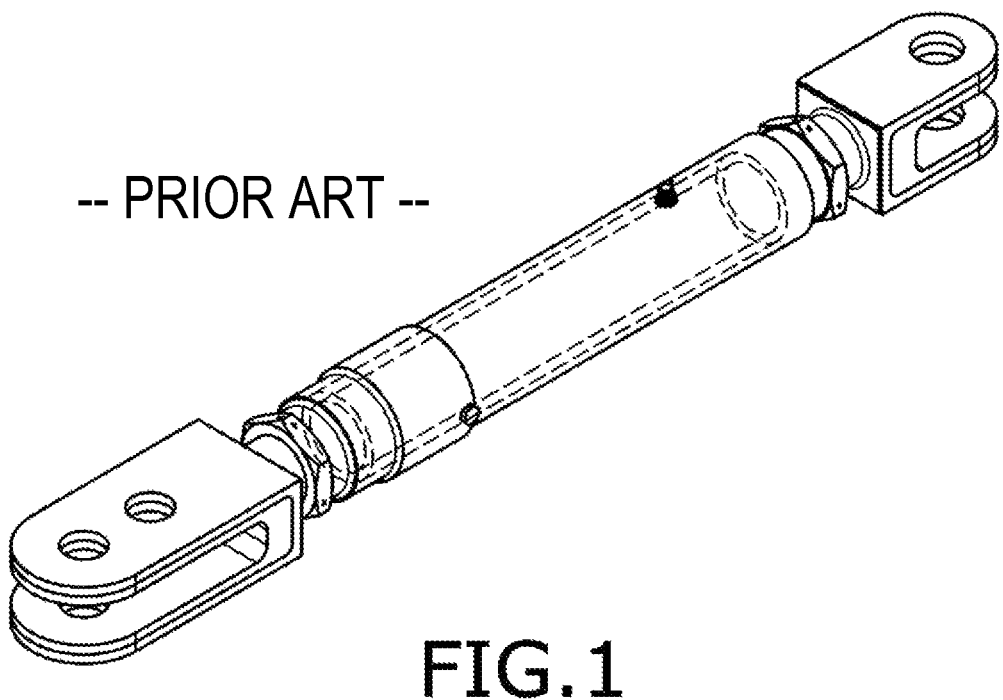
FIG. 1 In this figure an example of a rod according to the prior art is displayed in a perspective view.

In FIG. 1 an example of a rod according to the prior art is displayed in a perspective view. The rod is metallic and the outer and inner bodies are manufactured independently and then assembled. Here the rod ends are attached to the rod.

Figure 2:
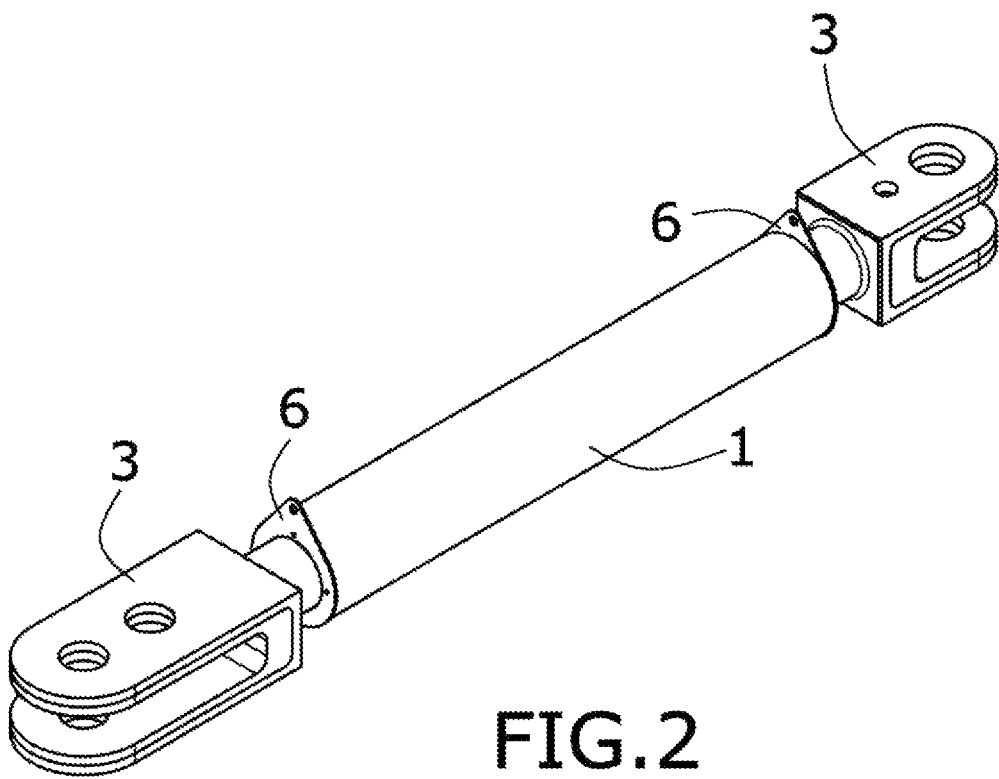
FIG. 2 In this figure an example of a rod according to one embodiment of the invention is displayed in a perspective view. In this embodiment the rod is shown with the rod ends attached.

In a preferred embodiment of the invention, provided that the rod must be electrically conductor, the outer metallic inserts (5) provide integrated lugs (6) to connect with conductor bonding jumpers (100) (see, e.g., FIG. 9A), preferably made of copper. These lugs (6) are used to conduct the electricity to the external side of the whole structure. In FIG. 2 a perspective view of the whole structure according to the present invention is shown where the different functional parts are: outer body (1) of the rod, rod ends (3) in this embodiment with double hole lug at one side of the rod and single hole lug at the other side of the rod and lugs (6) integrated with the outer metallic inserts (5) not shown in this figure.

In another preferred embodiment of the invention a composite rod is manufactured characterized in that the assembly between the outer body (1), the inner body (2) and the rod ends (3) is double threaded, and the rod comprises outer metallic inserts (5) which are in contact with the conductor material (4) (in the case of the preferred embodiments of the invention, copper foil/s). These outer metallic inserts (5) are applied over the copper foil (4) and are used for connecting the rod ends (3), providing the required rigging capability. The right alignment between the threads of the inner body (2) and the outer metallic inserts (5) must be ensured, so that the rod ends (3) can be screwed on them at the same time. Moreover, the length rigging is to be adjusted by rotating the rod body, which causes both rod ends to be screwed in or out simultaneously (turnbuckle concept). That means that even if the geometry of the metallic inserts (5) at both rod ends (3) is the same, in one rod end (3) the metallic insert (5) must have right handed thread and in the other must have left handed thread.

Figure 3:
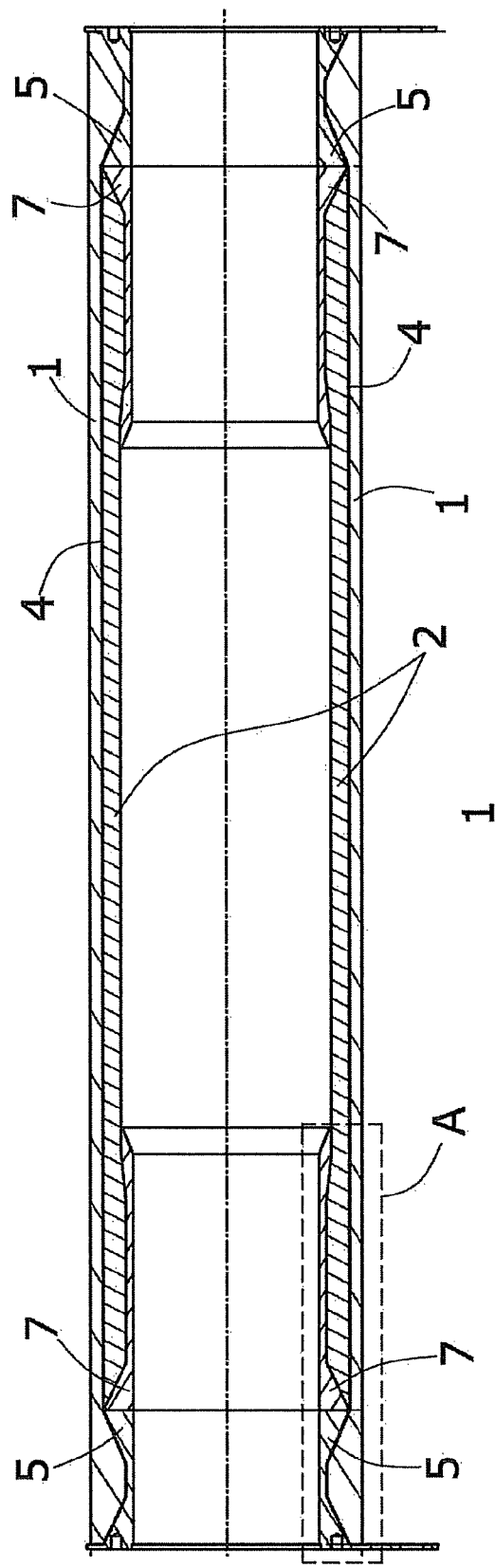
FIG. 3 This figure shows an embodiment of the invention with the inserts in the outer body in a sectioned view. In this view the rod ends have been removed and the two bodies, the conductor material and the metallic inserts are depicted.
Figure 4:
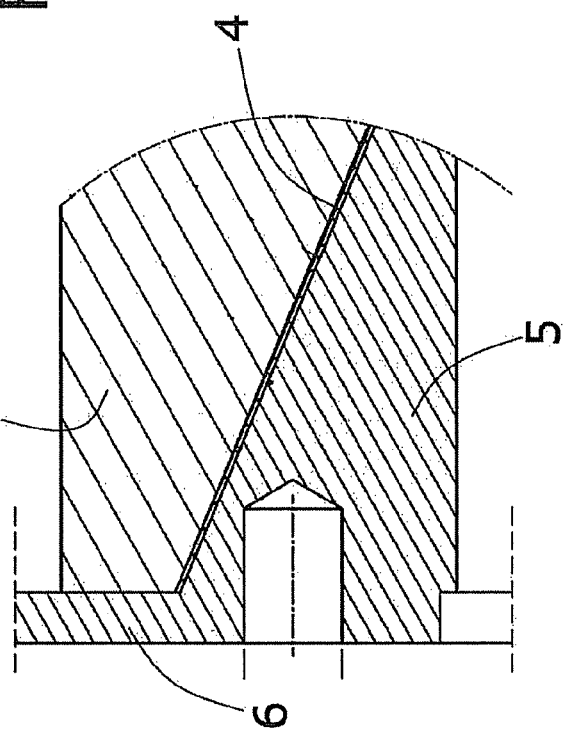
FIG. 4 In this figure a detailed view of the previous embodiment with electrical bonding lugs is shown.

In a more preferred embodiment, the inner body (2) comprises inner metallic inserts (7). The inner metallic inserts (7) and the outer metallic inserts (5) are independent to each other in order to provide full independent load path. The inner metallic inserts (7) are designed with a slope in order to reduce the peak tensions by chamfering and are longer than the outer metallic inserts (5) to allow the rod ends (3) to be screwed in and out properly during the rigging. In FIGS. 3, 4 and 5 different detailed views of the rod with inner metallic inserts (7) and outer metallic inserts (5) with integrated lugs (6) are seen where different parts are distinguished: outer body (1) of the rod, inner body of the rod (2), copper foil (4), the outer metallic insert (5), the integrated lug (6) to the outer metallic insert (5) and the inner metallic insert (7). In this figures the rod ends have been removed and the two bodies (1, 2), the conductor material (4) and the metallic inserts (5, 7) are depicted.

The outer metallic inserts (5) and the inner metallic inserts (7) are shaped in another embodiment of the invention to avoid the pull out/pull through effect. The metallic inserts (5, 7) are made in a preferred embodiment of Titanium because of the material compatibility to avoid corrosion problems. One of the requirements is to have a good corrosion performance, and, for example, the combination CFRP-Ti (carbon fibre reinforced plastic-Titanium) is the best one in terms of galvanic corrosion due to the similar potential and hence the reduced galvanic couple. This shape provides an extra thickness of the bodies (1, 2) in the inserts area.

The rod of the invention has, in different embodiments, the rod ends (3) either metallic or made of composite.

In FIG. 6 the different parts are seen in different detailed cross-sectional views (AA, BB, CC) of the same rod without the rod ends (3). FIG. 6B shows a cross-section view of the cut BB in FIG. 6A. In this figure, which represents the center of the rod, only the outer body (1), the conductor material (4) and the inner body (2) can be seen. FIG. 6C shows a cross-section view of the cut CC in FIG. 6A. In this figure the outer body (1), the inner body (2), the conductor material (4) and the inner metallic insert (7) can be seen. It can also be seen that the inner body (2)'s inner diameter is bigger in substantially the centre of the structure (across line BB) than in the edges (across line CC). FIG. 6D shows a cross-section view of the cut DD in FIG. 6A. In this figure it can only be seen the outer body (1), the conductor material (4), and the outer metallic insert (5). That is because in this embodiment, the inner body (2) does not reach the end of the outer body (1), which can also be better understood in view of FIG. 5.

Figure 7:
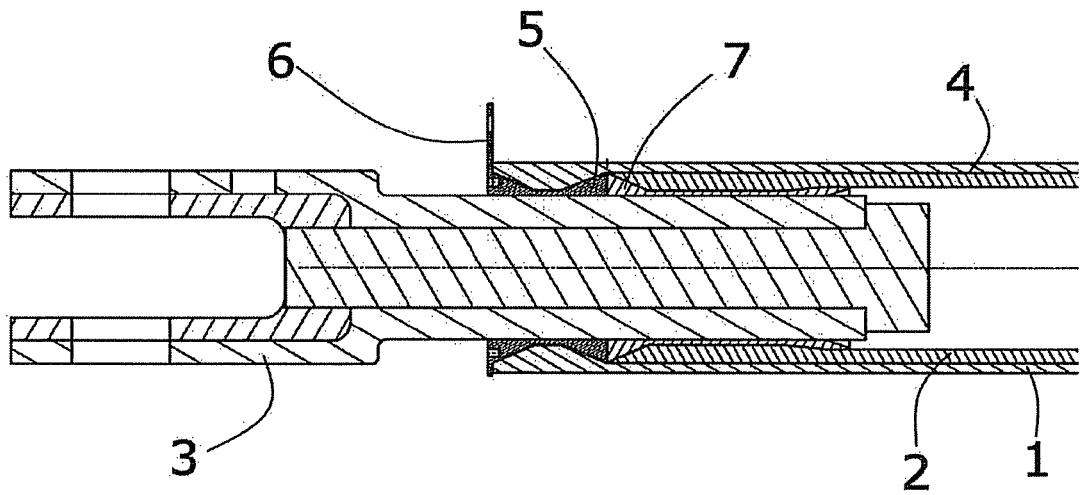
FIG. 7 In this figure even another partial view of an embodiment of the invention is shown with a rod end attached to the rod.

In FIG. 7 a detailed partial view of an embodiment of the invention with the integrated lugs (6) and rod ends (3) included is seen. In this figure an embodiment is shown with the rod end (3) with a single hole lug.

In even a more preferred embodiment of the invention, the composite structure comprises a quasi-isotropic laminate. The rigidity and strength behavior of a fibre composite is largely determined by the choice of the fibre material and the layers orientation, from a unidirectional laminate (all fibres following the same orientation) to a quasiisotropic laminate (same amount of fibres running in each direction). Before the manufacturing can be started, it is required to know the order of magnitude of the structures, the number of plies, orientation (or stacking sequence), material properties required etc. For that reason, a pre-sizing is preformed. Since all the calculations are analytic, and there is no Finite Element Model (FEM) calculation, both the pre-sizing and the sizing are done taking into account only the center part of the rod body (excluding the transition area between the maximum diameter and the threaded area), and approaching it to a homogeneous cylinder. The Young's modulus of a CFRP laminate can be estimated considering only the percentage of layers in the 0° direction (that is the longitudinal direction of the rod): $E \approx \phi 0 \cdot E_E$, with E: Young's modulus of the body.

$E_E$ : Young's modulus of a single layer (CFRP) parallel to the fibre direction.

$\phi 0$: % of layers following the 0° direction of the laminate.

For this embodiment a pre-size calculation is performed considering a load focused orientation of φ0=60% of fibres following the 0° (that is the longitudinal direction of the rod). Taking into account the type of material used in this embodiment, the CFRP laminate, the Young's modulus of the laminate is E≈60% $E_{ℓ}$ =109200.00 MPa. As the metallic inserts (5, 7) are used in this calculation, the inner radius considered is a 15% higher in order to provide room for these inserts. With these assumptions, 19 layers are needed (11 of them at 0°) for the outer laminate, that is, the laminate for the outer body (1), and 29 layers (17 of them at 0°) are needed for the inner laminate, that is, the laminate for the inner body (2). These thicknesses, lead to a weight of 1051.9 g. And that means a 46% on weight saving with respect to the previous metallic design of the state of the art. This result is much more advantageous, and shows the benefit of performing an optimize lay-up and making the most of the fibres properties.

In a new embodiment of the invention, with the rough estimation of the presize calculations, a more detailed calculation is performed. The new inner body (2) inner radius ($R_{iI}$) takes into account the insert thickness and geometry.

$$R_{iI}=R_{Oins}=29.91 \text{ mm}.$$

And between the two laminates, outer body (1) and inner body (2) there are two layers of copper foil (4) to provide electrical continuity between the two rod ends (3). These layers in this embodiment have a total thickness of $t_c$=76 μm.

As it has been explained, it is used in the pre-size the approach of considering the Young's modulus of the CFRP laminate, rated only by the percentage of layers in the 0° direction, E≈φ0·$E_{ℓ}$ . In order to improve the calculations, it is used now the classical laminate theory for an anisotropic material, and the Hooke's law of a multilayer composite. From the pre-size, the results show that 19 layers and at least 11 in 0° for the outer body (1), and 29 layers with at least 17 in 0° for the inner body (2) are preferred. Applying the mentioned laminate theory to these laminates, higher values for the Young's modulus are got for both inner body (2) and outer body (1) than the values predicted by the pre-sizing approach (E≈φ0·$E_{ℓ}$ =60% $E_{ℓ}$ =109.2 GPa). For that reason, for the inner body (2) in this example it is reduced the number of plies to 27, because there is room for optimization.

There are many ways to arrange the plies to obtain a laminate with the desired number of them. In order to determine the optimal stacking sequence, to optimize the laminate, and taking into account the requirements of the constrained design, the followings stacking rules are considered:

Rule 1, Symmetry: The stacking sequence should be symmetric around the neutral axis. For each ply in direction+θi at a distance Zi of the middle plane, exists a ply in direction+θi at a distance−Zi, θi being the angle with regard to Z, the main load direction. If perfect symmetry is not possible, the "asymmetry" shall be kept as close as possible to the middle plane.

Rule 2, Balanced: The laminate should be balanced: for each ply in direction+θi exists a ply in direction−θi. If perfect balance is not possible, the "unbalance" shall be kept as close as possible to the middle plane.

Rule 3, Plies orientation percentage: For solid laminate parts the percentage of the plies laid-up in each direction should be comprised between 8% and 67%.

Rule 4, External plies: External plies should not be in the direction of the main load. It is recommended to use a 45°/135° pair for the outer plies of the laminate. However, in certain application, a 90° external ply is used.

Rule 5, Regular distribution of layer orientation: The layers with the same orientation should be uniformly distributed throughout the stacking sequence to minimize coupling effects and ensure a homogeneous stress distribution throughout the laminate.

Rule 6, Maximum grouping: The maximum number of plies grouped together in the same direction is limited. This maximum number depends on the ply thickness, using the lower of: nmax.=4 plies or tmax=1.0 mm. However a maximum of three plies is recommended. In cases where the laminate is especially thick, and under agreement with stress and manufacturing, nmax could be increased.

Rule 7, Improve buckling behavior: In the case of compressive load, placing 0° direction layers as far from the symmetry line as possible increases the buckling allowable.

These stacking sequences are taken which verify the previous rules: [90/0/0/0/45/135/0/0/0/135/45/0/0/0/90/0/0/135/45/0/0/0/45/135/0/00/90] for the inner laminate of the inner body (2) and [45/135/0/0/90/0/0/90/0/0/0/90/0/0/90/0/0/135/45] for the outer laminate of the outer body (1).

In a more preferred embodiment of the invention, to increase the effect of independent load path, a layer of release film (not shown in the figures) can be also used between the inner body (2) and the copper foil (4). This release film has not been considered in the sizing.

The copper foil (4) must be in contact with the outer metallic inserts (5), to provide the electrical continuity between them. In order to ensure the right conductivity between them, a special densely loaded epoxy resin filled with micro sized highly conductive particles, like Kembond Epoxy SE-002 produced by Ken) non Ltd. is used in another embodiment of the invention. This kind of resins is already available in the market and has proved its electrical conductivity. The copper foil (4) can be laid dry and after than the resin applied, or just pre-impregnated on it.

Finally, to go a step further in the optimization in a last embodiment, it is proposed to use a better material and choose the most convenient geometrical parameter to size. As the described rod is proven, the current outer diameter is used as an input. For the material, it is considered a combination of high modulus fibre like M46JB-6000 from Toray Industries Inc. and atypical resin like HexFlow® RTM6-2 from Hexcel Corporation. Applying the rule of mixtures, (assuming a fibre volume content of φ0=60%) a Young's modulus for the single layer of $E_{ℓ}$ =262.76 GPa is obtained and a Young's modulus for the laminate of E=φ0·$E_{ℓ}$ =157656.00 MPa. Assuming the single ply thickness of this material to be t=0.2 mm, 12 layers are preferred (7 of them at 0°) for the outer laminate of the outer body (1), and 16 layers (10 of them at 0°) are needed for the inner laminate of the inner body (2). With these thicknesses and the density provided by the rule of mixtures, the weight of the structure is 674.4 g, only a 41% of the weight of the original metallic structure. With this rod an excellent value of 59% of weight saving is obtained.

Another aspect of the invention is to provide a single shot manufacturing method. An embodiment of this method comprises an additional step before the placing of the conductor material (4), of placing a release film over the inner body (2), the release film as it has been explained previously.

Figure 8A:
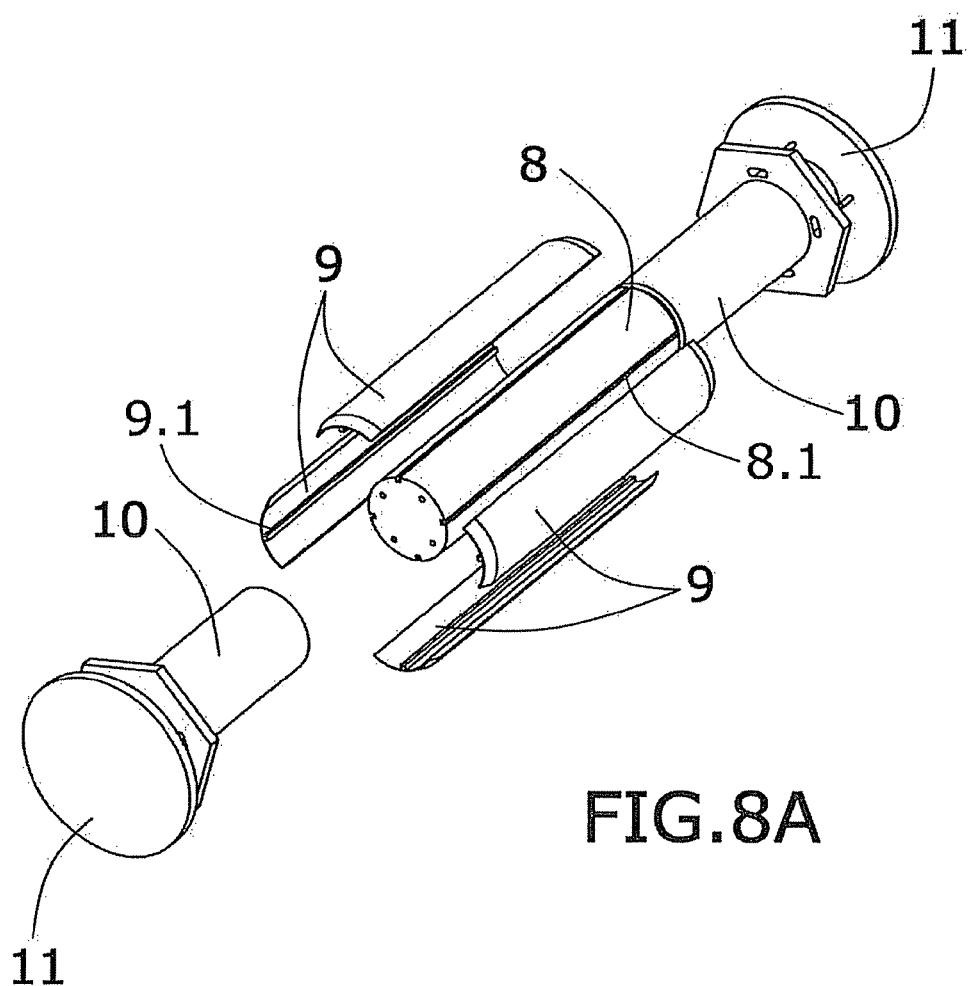
FIG. 8A shows a perspective exploded view of the whole tool.

Even another aspect of the invention is to provide a tool for the manufacturing of the rods described. A particular embodiment of this tool comprises at least two pins in order to facilitate the transfer of the movement from the machine to the central mandrel (8). FIG. 8 shows an embodiment of the tool where different parts are distinguished: central mandrel (8), crown parts (9), threaded sleeves (10), end tools (11). FIG. 8A shows a perspective exploded view of the whole tool. FIG. 8B shows a side view where different parts of the assembled tool can be distinguished. In this figure when the winding is done over the tool, the crown parts make the winding wider in the center of the inner rod than in the edges.

To show an example of how the crown parts (9) are extracted from the whole structure once the rod has been cured in the oven, it is shown in FIG. 9 the first part of the process when one crown part (9) is disassembled. FIG. 9 shows the disassembling process of the elements of the tool from a cross-sectional view of the rod. In order to facilitate the disassembling and demoulding, release agent can be used in one embodiment during the assembly. For the same purpose, the central mandrel (8) should not be cylindrical but conical, and somehow should be clearly defined the side from where the parts must be disassembled (a fool proof design). This conical concept will also prevent the installation of the wrong metallic inserts (5, 7) (inserts with the wrong thread handedness) in the wrong side of the rod. FIG. 9A shows a cross-section view of the beginning of the process with all the crown parts (9) assembled, but the central mandrel (8) removed. FIG. 9B shows a cross-section view of the first crown part (9) being disassembled from the others. In these cross-sectional views, the outer body (1), the inner body (2), the conductor material (4), and an integrated lug (6) is shown.

Besides, in another embodiment, the central mandrel (8) is provided with at least a groove (8.1) and at least one of the crown parts (9) is provided with at least a ridge (9.1) that fits in the groove (8.1), so that the rotation of the central mandrel (8) is transmitted to that crown part (9) and that crown part (9) pushes all the remaining crown parts without ridges (9.1). On another preferred embodiment, the central mandrel (8) is provided with as many slightly conical grooves (8.1) as crown parts (9), regularly distributed, and each crown part (9) is provided with a slightly conical ridge (9.1) that fits in a groove (8.1). This groove (8.1) and ridge (9.1) concept allows the rotational movement transmission from the central mandrel (8) to the crown parts (9), while the conical shape of both the grooves (8.1) and the ridges (9.1) allow the proper pre-assembly of the tool preventing the falling of the crown parts (9) at the lowest position, but allowing the removal of the central mandrel (8) sliding it along the direction parallel to the tool direction.

Finally FIGS. 10 and 11 show an example of how the tool for manufacturing the rod is placed in the whole structure forming the complex rod-tool. Once the rod is cured in the oven, this whole complex of the tool is disassembled from the finished rod. FIG. 10 shows the complex tool-rod in the moment of manufacturing the rod in a cross-sectional view of the rod. FIG. 11 is the detailed view of the part E of FIG. 10. In this detail the inner diameter of the inner body (2) is bigger in the centre than in the edges, but in this embodiment the inner metallic insert (7) is placed just over the beginning of the crown parts (9). It also can be seen that in this embodiment, the threaded sleeves (10) of the tool are hollow and the end tools (11) are placed inside the threaded sleeves (10).

The invention claimed is:

1. A composite rod device adapted to keep two elements apart a determined distance and carry a load applied between the two elements, the composite rod device comprising:
a structure including an outer hollow body comprising a composite material and an inner hollow body comprising a composite material, wherein each one of the outer hollow body and the inner hollow body is independently able to withstand the applied load, thereby providing a double load path, and wherein a central portion of the inner hollow body comprises an inner diameter that is larger than an inner diameter of peripheral portions of the inner hollow body;
a first rod end arranged at a first end of the structure and a second rod end arranged at a second end of the structure; and
a conductor material arranged between the outer hollow body and the inner hollow body.

2. The composite rod device according to claim 1, wherein the conductor material comprises at least one layer of copper foil.

3. The composite rod device according to claim 1, wherein:
an assembly between the outer hollow body, the inner hollow body, the first rod end, and the second rod end is double threaded; and
the outer hollow body comprises outer metallic inserts in contact with the conductor material.

4. The composite rod device according to claim 3, wherein the outer metallic inserts comprise integrated lugs arranged to connect with conductor bonding jumpers.

5. The composite rod device according to claim 3, wherein the inner hollow body comprises inner metallic inserts.

6. The composite rod device according to claim 4, wherein the inner hollow body comprises inner metallic inserts.

7. The composite rod device according to claim 1, wherein each of the first rod end and the second rod end comprises at least one of metallic material and composite material.

8. The composite rod device according to claim 6, wherein the outer metallic inserts and the inner metallic inserts are shaped so to avoid a pull out effect or a pull through effect, and at least one of the outer hollow body and the inner hollow body comprises increased wall thickness proximate to the metallic inserts relative to a wall thickness in at least one area distal from the metallic inserts.

9. The composite rod device according to claim 1, wherein the composite material comprises a quasi-isotropic laminate.

10. The composite rod device according to claim 1, further comprising a layer of release film between the inner hollow body and the conductor material.

11. The composite rod device according to claim 2, comprising a densely loaded epoxy resin comprising micro sized highly conductive particles establishing contact between the conductor material and the outer metallic inserts.

12. The composite rod device according to claim 1, wherein the composite material comprises a fibre-reinforced laminate with about 60% of the fibres of the laminate following a 0° orientation along a longitudinal axis of the composite rod, and wherein the outer hollow body comprises 19 layers.

13. The composite rod device according to claim 9, wherein the quasi-isotropic laminate for the outer body comprises 19 layers, and the quasi-isotropic laminate for the inner body comprises 27 layers.

14. The composite rod device according to claim 1, wherein the composite material comprises a high modulus fibre that confer the composite material with a Young's modulus of at least about 157.656 MPa, wherein the outer hollow body comprises 12 layers, and wherein the inner hollow body comprises 16 layers.

* * * * *